United States Patent Office 3,317,451
Patented May 2, 1967

3,317,451
PROCESS FOR PREPARING PREVULCANIZED
CHLOROPRENE POLYMER LATICES
David Apotheker, Wilmington, Del., assignor to E. I. du Pont de Nemours and Company, Wilmington, Del., a corporation of Delaware
No Drawing. Filed June 24, 1963, Ser. No. 290,156
17 Claims. (Cl. 260—29.7)

This invention relates to the preparation of latices of polymeric materials. More particularly, it relates to the preparation of prevulcanized chloroprene polymer latices exhibiting improved stability.

In the preparation of dipped films from chloroprene polymer latices it is usually necessary, to obtain optimum tensile properties, to subject the dried films to a temperature of about 140° C. for at least an hour. It has been discovered that dipped films which cure rapidly at relatively low temperatures may be obtained from a prevulcanized latex prepared by polymerizing chloroprene, to a certain critical degree, in an aqueous emulsion in the presence of a dialkyl xanthogen disulfide, adding to the latex hydrazine or a primary amine, and submitting the latex to a temperature ranging from about 10° C. to about 100° C. to convert the polymer in the latex from sol to gel form; however, prevulcanized latices prepared in this way have certain limitation. When such a latex is stored for several weeks, the polymer tends to coagulate. Also during storage there is a gradually increasing tendency, as the latex ages, for it to yield films of less satisfactory tensile properties.

It has unexpectedly been found that a prevulcanized chloroprene polymer latex having increased colloidal stability and which yields films of consistently good tensile properties even after prolonged storage can be prepared by a process for preparing a prevulcanized chloroprene polymer latex which comprises: (I) polymerizing chloroprene in aqueous emulsion in the presence of (a) from about 0.05 to 2 parts by weight, per 100 parts of monomer, of a dialkyl xanthogen disulfide in which each alkyl group contains from about 1 to 8 carbon atoms, and (b) from about 3 to 5 parts by weight, per 100 parts of monomer of an emulsifying composition comprising from about 15 to 50 weight percent of a fatty acid soap and from about 50 to 85 weight percent of a rosin acid soap, said polymerization being carried out to the maximum monomer conversion at which only sol polymer is obtained; (II) treating the resulting latex at a pH greater than about 10 and in an inert atmosphere free of atmospheric oxygen by adding thereto at least about 0.005 mole, per 100 parts by weight of polymer in the latex, of a mixture comprising (a) a member of the group consisting of hydrazine, a primary monoamine and a primary polyamine, in which last two compounds the amino group is attached to an aliphatic carbon atom, and (b) a secondary monamine selected from the group consisting of secondary monamines in which the amino group is attached only to aliphatic carbon atoms, and secondary monoamines in which the amino group is part of a saturated heterocyclic ring, the molar ratio of (a) to (b) being in the range of about 0.5 to 5 of (a) to 1 of (b); and (III) subjecting the resulting treated latex to a temperature from about 10° C. to 100° C. for a period of time sufficient to convert the sol polymer contained in the latex to gel polymer.

By "sol polymer" is meant polymer which is soluble in benzene. By "gel polymer" is meant polymer which is insoluble in benzene. Benzene solubility is determined by conventional methods, as, for example, by isolating a sample of the polymer and adding the dried sample to a quantity of benzene. A 2- to 3-gram sample of "sol" polymer will dissolve in 250 milliliters of benzene at room temperature in 5 to 10 hours with mild agitation.

The polymerization may be carried out in aqueous emulsion using any of the conventional free-radical polymerization catalysts. These include alkali metal or ammonium ferricyanides and peroxy compounds such as alkali metal or ammonium persulfates, hydrogen peroxide, cumene hydroperoxide, and dibenzoyl peroxide.

The polymerization may be carried out between 0° C. and 80° C., preferably between 40° C. and 50° C.

The concentration of monomeric material present in the aqueous emulsion is not critical. In general, 30 to 60 percent, by weight, based on the total weight of the emulsion, is the range of concentrations of monomer used in the preparation of the latex.

It is preferred to carry out the polymerization in an alkaline system having a pH greater than 10. If the pH is lower than this, it is necessary to adjust the pH of the emulsion to higher than 10 before treatment with the amine in order to avoid coagulation of the latex during the amine treatment.

The dialkyl xanthogen disulfides which may be used have the formula

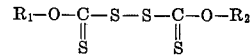

in which $R_1$ and $R_2$ are alkyl groups containing one to eight carbon atoms. Examples of suitable compounds are dimethyl xanthogen disulfide, diethyl xanthogen disulfide, dipropyl xanthogen disulfide, diisopropyl xanthogen disulfide, dibutyl xanthogen disulfide, and bis(2-ethylhexyl) xanthogen disulfide. The preferred compounds are those in which the alkyl groups have one to four carbon atoms.

The amount of dialkyl xanthogen disulfide to be used in accordance with this invention varies from about 0.05 to about 2 parts, by weight, per 100 parts of monomer. If more than about 2 parts of the dialkyl xanthogen disulfide is used, the final latex does not yield a curable film when treated with the amine. When less than 0.05 part is used, there is not a sufficient amount of xanthogen compound present in the system to prevent formation of gel polymer during polymerization. The preferred amount is the amount of dialkyl xanthogen disulfide just sufficient to allow polymerization to proceed to 100% monomer conversion without the formation of gel polymer. The amount of each dialkyl xanthogen disulfide required will depend on the molecular weight of the disulfide. Also, for an unknown reason, there are small differences in effectiveness among molecularly equivalent amounts of the various dialkyl xanthogen disulfides. In the case of diethyl xanthogen disulfide, about 0.5 to 0.6 part by weight is required. In the case of diisopropyl xanthogen disulfide about 0.7 part is required; 0.7 to 1 part is particularly preferred. In general, the preferred amount of dialkyl xanthogen disulfide ranges from about 0.5 part to about 1.5 part.

Unless the polymerization is allowed to proceed to the maximum monomer conversion attainable in the system at which only sol polymer is formed, films prepared from the treated latex will have unsatisfactory tensile properties. It is preferred to use just enough of the dialkyl xanthogen disulfide so that the polymerization can be allowed to proceed to 100 percent monomer conversion. The amount of each dialkyl xanthogen disulfide required to prevent formation of gel polymer when polymerization is carried to 100 percent monomer conversion can be determined by known techniques and is within the scope of one skilled in the art. When less than this amount is used, the polymerization should be stopped before it has proceeded to 100 percent conversion, but it is critical that polymerization be allowed to proceed to the highest possible conversion at which only sol polymer is obtained.

The determination of the percent of monomer conversion permissible in a polymerization may be made by known methods. One method is by taking samples of latex during the course of a polymerization, isolating polymer from the latex, and examining the polymer for a benzene-insoluble component. Polymerization in subsequent runs is then stopped at the conversion just prior to the formation of benzene-insoluble polymer. A more convenient way is to determine intrinsic viscosity of successive samples of latex during a polymerization using the Vistex method described in "Industrial and Engineering Chemistry," 49, 1709–10 (1957). Formation of microgel is indicated by a decrease in intrinsic viscosity of the latex. Polymerization in subsequent runs is then stopped at the conversion just prior to microgel formation. Optionally, polymerization may be stopped just after the peak in intrinsic viscosity has been reached. A convenient short method is to dissolve 2 milliliters of the latex in 100 milliliters of tetrahydrofuran, shake it thoroughly, and observe the turbidity of the resulting solution. The first point at which slight turbidity is observed is the point at which polymerization should be stopped.

Polymerization may be stopped by the addition of "short-stopping" agents, such as phenothiazine and 4-tert-butylcatechol, as described in U.S. Patent 2,576,009. Unreacted monomer may be removed by known methods, such as by steam stripping as disclosed in U.S. Patent 2,467,769.

It has been found that the emulsifying agent to be used in the system during polymerization is critical if the resulting latex is to be colloidally stable, that is, stable against coagulation of the prevulcanized polymer during storage. The emulsifying agent should consist of water-soluble salts (preferably sodium, potassium or ammonium salts) of a mixture of rosin acids and fatty acids. The rosin acids include the various rosins of commerce and their transformation products such as hydrogenated rosins, partially polymerized rosin, and disproportionated rosin. The latter, in which the unsaturated ingredients are compensatingly hydrogenated and dehydrogenated to the corresponding saturated and aromatic compounds, is particularly preferred.

The fatty acids may be straight-chain saturated or unsaturated carboxylic acids containing 12 to 30 carbons or the products prepared by dimerizing or trimerizing the unsaturated fatty acids. Examples of suitable fatty acids include lauric acid, stearic acid, eicosanoic acid, oleic acid, linoleic acid, and dimers and trimers of polyunsaturated fatty acids such as linoleic acid. Of these, the particularly preferred acids are oleic acid and a mixture of dimers and trimers of linoleic acid.

The total amount of the emulsifying composition should range from, by weight, about 3 to about 5 parts per 100 parts of monomer used in the polymerization. If less than 3 parts is used, the resulting latex will not have satisfactory colloidal stability. More than 5 parts will make it difficult to prepare films from the latex by a dipping process or to prepare foams by conventional techniques. Of the total amount of emulsifying agent used, the percentage of fatty acid soap should range from about 15 to about 50 percent. Less than 15 percent does not give the resulting latex satisfactory colloidal stability and more than 50 percent adversely affects the quality of dipped films prepared from the latex.

It may sometimes be desirable to supplement the rosin salt and fatty acid salt by other dispersing agents, such as the salts of aromatic sulfonic acids. These are useful in reducing the small amount of coagulation which may occur in the continuous polymerization system or when the latex is distilled to remove unused chloroprene monomer.

The mixture of components (a) and (b) will be referred to hereinafter as the "amine mixture" despite the fact that component (a) can be hydrazine. The amine mixture is added to the latex after polymerization is complete and, in cases where polymerization is not carried to 100% monomer conversion, after the latex has been stabilized against further polymerization and any unused monomer has been removed. The components (a) and (b) may be added separately or as a mixture to the latex. It is preferred to add the mixture to the latex in a dilute form in order to avoid coagulation of the latex. Hydrazine may be conveniently added as an aqueous solution of hydrazine hydrate. Water-soluble amines may also be added as aqueous solution. If the amine is not water-soluble, it may be emulsified with water, using an emulsifying agent such as sodium oleate or the sodium salt of a fatty alcohol sulfate. Optionally, a water-insoluble secondary amine may be emulsified with the monomer prior to polymerization. The latex may be agitated during the addition of the amine. This however, is not essential.

It is essential to carry out the amine treatment in an inert atmosphere; that is, in an atmosphere free of oxygen. This is conveniently done by flushing the reaction vessel free of oxygen with an inert gas such as nitrogen or argon and maintaining an atmosphere of the gas in the vessel during the treatment.

The reaction is carried out at any temperature from 10° C. to 100° C. The time required for the conversion of the sol polymer to gel polymer depends upon the temperature. Below 10° C. the reaction proceeds too slowly to be practical. Temperatures above 100° C. are not attainable in the aqueous latex at ordinary pressures. Higher temperatures could be used at superatmospheric pressures. The time required will vary somewhat with the effectiveness of the particular treating agent being used. The preferred temperature range is from 60 to 100° C. At 60° C., twelve hours is usually sufficient to gel the polymer, and at 100° C., gel formation should be complete within one-half hour. At 10° C. as long a time as 10–14 days may be required.

The amine mixture should be added in such an amount that there is a total of at least 0.005 mole of total amine mixture per 100 parts by weight of polymer. In using the term "mole" of amine mixture with the term "parts by weight" of polymer, it is to be understood that the unit of the molecular weight in the mole is to be consistent with the unit used in expressing the weight of the polymer. For example, if the weight of the polymer is expressed in pounds, a molar amount of amine mixture will correspond to the molecular weight in pounds of the amines (including hydrazine if present). Thus, the term "moles" could be expressed as "part moles," where "part" represents the weight unit being used in a particular situation. However, for convenience, the term "moles" has been used throughout.

If less than about 0.005 mole of amine mixture is used per 100 parts by weight of polymer, films prepared from the latex will have unsatisfactory tensile properties. The preferred amounts range from 0.01 to 0.2 mole. More than this may be used, but there is no advantage to be gained by using a larger amount.

If less than 0.5 mole of component (a) per mole of component (b) is used, the films prepared from the latex do not develop a full cure. On the other hand, it requires at least 1 mole of component (b) per 5 moles of component (a) to prevent the decrease of tensile properties of the films as the latex ages.

Component (a) of the amine mixture which is used to prevulcanize the polychloroprene latex may be hydrazine or a primary monoamine or primary polyamine in which the amino group is attached to an aliphatic carbon atom. Aromatic groups such as phenyl radicals may be present in the molecule provided they are not directly attached to the amino group. Suitable amines include both cyclic and acyclic alkylamines, acyclic alkylene-diamines, cycloalkylene-diamines, and polyalkylenepolyamines. It is to be understood that these aliphatic radicals may be substituted with phenyl radicals. Also the aliphatic chains may be interrupted by or fused with arylene radicals, provided that the amino group is attached to an aliphatic carbon atom. Thus component (a) also includes such amines as aralkylamines, poly(aminoalkyl)-substituted aromatic rings and benzo-substituted cycloaliphatic amines. The radicals to which the amino group or groups are attached preferably are those containing no more than 16 carbon atoms since there is no advantage to be gained in using amines of higher molecular weight.

Representative examples of suitable monoamines are methylamine, ethylamine, n-propylamine, isopropylamine, n-butylamine, sec-butylamine, hexylamine, decylamine, 2-ethyl-hexylamine, benzylamine, and phenethylamine. Representative examples of polyamines include ethylenediamine, 1,2-propanediamine, 1,4-butanediamine, 1,6-hexanediamine, 1,4-cyclohexanediamine, 1,10-decanediamine, 2-phenyl-1,3-propanediamine, $\alpha,\alpha'$-xylenediamine, 2,4-diphenyl-1,3-butanediamine, diethylenetriamine, and tetraethylenepentamine.

The most preferred primary amines are those containing 2 to 8 carbon atoms. Especially preferred are 1,6-hexanediamine, ethylenediamine, and butylamine.

Component (b) of the amine mixture is a secondary monoamine which may be a dialkylamine or which may form part of a saturated heterocyclic ring containing 5 or 6 atoms in the ring. The alkyl groups may be cyclic or acyclic and may be substituted with phenyl, hydroxy or alkoxy radicals. It is preferred that the dialkylamine should contain a total of at least 4 carbon atoms in the molecule so that the compound is not too volatile for practical uses. In general, there is no advantage to be gained in using a dialkylamine containing more than 16 carbon atoms.

The heterocyclic compounds should contain besides carbon, only one nitrogen and no more than one etheric oxygen in the ring. The heterocyclic ring may be substituted with alkyl, aryl, hydroxy or alkoxy groups.

Examples of suitable secondary amines include diethylamine, dipropylamine, dicyclohexylamine, n-butylmethylamine, cyclohexylmethylamine, hexylmethylamine, bis(2-ethyl-hexyl)amine, methylbenzylamine, pyrrolidine, piperidine, morpholine, 2,6-dimethylmorpholine, diethanolamine, and 2,2'-diethoxydiethylamine.

The invention will now be described in and by the following examples of preferred embodiments thereof wherein all parts and percentages are by weight unless otherwise specified.

*Example 1*

A latex is prepared by polymerizing chloroprene in an aqueous emulsion using the following recipe:

| | Parts by weight |
|---|---|
| Chloroprene | 100 |
| Disproportionated rosin [1] | 4 |
| Oleic acid | 1 |
| Sodium hydroxide | 0.87 |
| Diisopropyl xanthogen disulfide | 0.7 |
| Water | 100 |
| Sodium sulfite | 0.3 |

[1] The disproportionated rosin used in this and following examples has been partially neutralized with sodium carbonate so that it has an acid number of about 140. It is commercially available from Hercules Powder Co. as Resin 731-SA.

An atmosphere of nitrogen is maintained in the reaction vessel. The catalyst used is a one percent aqueous solution of potassium persulfate which is added to the polymerization system at a rate sufficient to maintain the desired rate of polymerization. The temperature of polymerization is 40° C., and the polymerization is carried out to a 100 percent monomer conversion. The polymer content of the latex is about 50 percent and the pH is about 12.8.

A 2-gram sample of polymer is completely soluble in 250 milliliters of benzene at room temperature with mild agitation. The sample is obtained in the following manner:

A sample of latex is removed from the system and the polymer is precipitated with acetone. The wet coagulum is dissolved in benzene and reprecipitated with acetone. The coagulum is separated from the benzene and dried first in air and then under vacuum at 25–30° C.

To a portion of the resulting latex (Sample A) is added an aqueous solution containing 5 parts (0.043 mole) of 1,6-hexanediamine and 2.5 parts (0.029 mole) of piperidine, per 100 parts of polymer. The latex is then maintained at 90° C. for 30 minutes. An atmosphere of nitrogen is maintained in the reaction vessel.

A portion of the treated latex is compounded using the following recipe:

| | Parts by weight |
|---|---|
| Polychloroprene (dry basis) | 100 |
| Zinc oxide | 5 |
| Clay | 10 |
| N-phenyl-2-naphthylamine | 2 |
| Sodium salt of sulfated methyl oleate | 1 |

Dipped films are prepared from the compounded latex by the following method: A form is immersed in a coagulant consisting of an acetone-methanol solution of equal amounts of calcium chloride and calcium nitrate tetrahydrate. The form is withdrawn from the coagulant and immersed in the compounded latex for 5 minutes. The form coated with the coagulated latex is withdrawn from the latex and again immersed in the coagulant for a period of 10 seconds. The coagulated film is leached in water for 4 hours and dried in a hot air oven for 2 hours at 70° C. and then for an additional 15 minutes at 100° C. The tensile properties of the films are measured by ASTM Method D 412–51 T.

Another portion of the treated latex is aged at 50° C. for 5 days. The latex does not coagulate during this period. This latex is then compounded and used for the preparation of dipped films as described above.

For comparison, to another sample of the untreated latex (Sample B) is added 5 parts of 1,6-hexanediamine and no piperdine and the latex is then treated in the same way as described above for Sample A. Thus, the treatment given to control Sample B is not within the scope of this invention.

Table I shows the properties of the films prepared from Sample A and Sample B, both before and after aging for 5 days.

TABLE I

| | Sample A | | Sample B | |
|---|---|---|---|---|
| | Unaged | Aged | Unaged | Aged |
| Tensile strength at the break, p.s.i. | 3,125 | 2,850 | 3,100 | 2,100 |
| Modulus at 600% elongation, p.s.i. | 730 | 725 | 650 | 1,100 |
| Elongation at the break, percent | 960 | 930 | 970 | 755 |

It is to be noted from the results tabulated above that the experiments with Sample A (within the scope of the invention) show that the latex is relatively unaffected by aging; however, the results with control Sample B show the deterioration on aging when the piperidine is omitted.

Similar results are obtained when the experiments of this example are repeated using, intsead of 0.7 part of diisopropyl xanthogen disulfide, one of the following in the preparation of the polymer:

| | Parts |
|---|---|
| Dimethyl xanthogen disulfide | 0.5 |
| Dibutyl xanthogen disulfide | 0.8 |
| Diethyl xanthogen disulfide | 0.6 |
| Diisoamyl xanthogen disulfide | 0.9 |
| Bis(2-ethylhexyl)xanthogen disulfide | 1.2 |

If the procedure for preparing Sample A is repeated increasing the amount of diisopropyl xanthogen disulfide in the polymerization recipe to 2.0 parts, satisfactory results are obtained.

If a latex is prepared and treated as described in this example above except that in the polymerization recipe 5 parts of disproportionated rosin are used, no oleic acid is added, and 0.85 part of 100% sodium hydroxide is used, it is found that if a portion of the treated latex is aged at 50° C. the sample coagulates in 2 days. This illustrates that operating outside the scope of the invention by omitting the oleic acid yields an unsatisfactory latex.

*Example 2*

The procedure of Example 1 is repeated except that the amount of diisopropyl xanthogen disulfide in the polymerization recipe is reduced to 0.1 part and the conversion is stopped at the desired point by adding an emulsion containing 0.01 part of phenothiazine and 0.01 part of p-tert-butylcatechol as described in U.S. Patent 2,576,009. Unreacted monomer is removed by steam stripping as described in U.S. Patent 2,467,769. The resulting latex has a polymer content of 12.5 percent.

The point at which conversion should be stopped is determined by removing samples of the latex during the polymerization, dissolving 2 milliliters in 100 milliliters of tetrahydrofuran, shaking thoroughly, and observing the solution for turbidity. Polymerization is stopped at the first appearance of turbidity. The latex has satisfactory properties similar to those of Sample A of Example 1.

*Example 3*

Following the procedure described in Example 1 a latex is prepared using the following recipe.

|   | Parts by weight |
|---|---|
| Chloroprene | 100 |
| Disproportionated rosin | 3 |
| A dibasic acid resulting from the polymerization of linoleic acid [1] | 2 |
| Water | 100 |
| Sodium hydroxide | 0.925 |
| Diisopropyl xanthogen disulfide | 0.7 |
| Sodium sulfite | 0.3 |

[1] Essentially a $C_{36}$ dibasic acid resulting from the polymerization of linoleic acid. The dimer content is about 75%, the trimer content is about 22%, and the monomer content is about 3%. It is commercially available as "Empol 1022" from Emery Industries, Inc.

The catalyst solution is a 5% aqueous solution of potassium persulfate.

To the resulting latex, which has a pH of 12.8, is added an aqueous solution containing 5 parts (0.043 mole) of 1,6-hexanediamine and 2 parts (0.024 mole) of piperidine per 100 parts of polymer and the latex is held at 90° C. for 30 minutes. An atmosphere of nitrogen is maintained in the reaction vessel. A portion of the treated latex is aged at 50° C. for 15 days. The latex does not coagulate during this time. Table II shows the properties of dipped films prepared from the unaged sample and the aged sample.

TABLE II

|   | Sample | |
|---|---|---|
|   | Unaged | Aged |
| Tensile strength at the break, p.s.i. | 2,900 | 2,920 |
| Modulus at 600% elongation, p.s.i. | 940 | 940 |
| Elongation at the break, percent | 900 | 880 |

The above-tabulated results indicate that the latices prepared remain highly satisfactory even after aging.

*Example 4*

Example 3 is repeated except that the latex is allowed to stand at room temperature (20–25° C.) for 128 hours instead of being heated at 90° C. for 30 minutes.

Satisfactory latices are obtained having similar properties to those of Example 3.

*Example 5*

Example 3 is repeated using 3 parts by weight (0.06 mole) of hydrazine hydrate instead of the 5 parts of 1,6-hexanediamine. The hydrazine hydrate is added to the latex as a 30 percent aqueous solution. Satisfactory latices are obtained having similar properties to those of Example 3.

*Example 6*

Example 3 is repeated except as follows. The amounts of diisopropyl xanthogen disulfide and sodium sulfite used in preparing the latex are increased to 0.85 part and 0.4 part, respectively. To a sample of the latex is added, per 100 parts of polymer, 1 part (0.009 mole) of 1,6-hexanediamine and 1 part (0.012 mole) of morpholine (added as an aqueous solution). The latex is held at 60° C. for 12 hours. An atmosphere of nitrogen is maintained in the reaction vessel. A portion of the sample is then held at 50° C. for 7 days, during which time the latex does not coagulate. Table III below shows the highly satisfactory properties of dipped films prepared from the unaged and aged treated latex, following the procedure described in Example 1.

TABLE III

|   | Sample | |
|---|---|---|
|   | Unaged | Aged |
| Tensile strength at the break, p.s.i. | 3,100 | 2,950 |
| Modulus at 600% elongation, p.s.i. | 850 | 865 |
| Elongation at the break, percent | 900 | 880 |

*Example 7*

A latex is prepared essentially as described in Example 1 except that the following recipe is used:

|   | Parts by weight |
|---|---|
| Chloroprene | 100 |
| Disproportionated rosin | 2.5 |
| Oleic acid | 2.5 |
| Sodium hydroxide | 1.05 |
| Diisopropyl xanthogen disulfide | 0.7 |
| Water | 100 |
| Sodium sulfite | 0.3 |

To a portion of latex is added 1,6-hexanediamine and piperidine as described in Example 1. The latex is maintained at 90° C. for 1 hour. Dipped films are prepared from the treated latex before and after aging for 6 days at 50° C. Table IV below shows the highly satisfactory properties of the films prepared from both aged and unaged latices:

TABLE IV

|   | Sample | |
|---|---|---|
|   | Unaged | Aged |
| Tensile strength at the break, p.s.i. | 2,590 | 2,600 |
| Modulus at 600% elongation, p.s.i. | 500 | 600 |
| Elongation at the break, percent | 1,040 | 990 |

A sample of the treated latex from which the above films were prepared is aged for over 100 days at 50° C. without any evidence of coagulation.

Example 8

A latex is prepared as described in Example 3 using the following recipe:

| | Parts by weight |
|---|---|
| Chloroprene | 100 |
| Disproportionated rosin | 3 |
| Polymerized linoleic acid (same as in Example 3) | 2 |
| Sodium hydroxide | 1.1 |
| Diisopropyl xanthogen disulfide | 0.85 |
| Water | 95 |
| Sodium sulfite | 0.35 |
| Sodium salt of formaldehyde-naphthalenesulfonic acid condensate | 0.15 |

Polymerization is carried out at 30° C. using a 5% aqueous solution of potassium persulfate as catalyst. Polymerization is carried out to complete conversion in an atmosphere of nitrogen. To the resulting latex which has a pH of 12.5, is added, per 100 grams of polymer, 1.25 parts (0.011 mole) of 1,6-hexanediamine and 1 part (0.009 mole) of 2,6-dimethylmorpholine. The latex is then maintained at 60° C. for 24 hours. An atmosphere of nitrogen is maintained in the reaction vessel. Dipped films are prepared as described in Example 1 from the freshly treated latex and from latex that has been aged at 50° C. for 5 days. The highly satisfactory properties of the dipped films, after drying at 70° C. for 2 hours, are shown below:

TABLE V

| | Sample | |
|---|---|---|
| | Unaged | Aged |
| Tensile strength at the break, p.s.i | 3,190 | 3,280 |
| Modulus at 600% elongation, p.s.i | 850 | 920 |
| Elongation at the break, percent | 980 | 915 |

Example 9

A polychloroprene latex is prepared using the following recipe:

| | Grams |
|---|---|
| Chloroprene | 100 |
| Disproportionated rosin | 3 |
| Polymerized linoleic acid (same as in Example 3) | 2 |
| Water | 95 |
| Sodium hydroxide | 0.9 |
| Diisopropyl xanthogen disulfide | 0.9 |
| Sodium sulfite | 0.35 |
| Sodium salt of formaldehyde-naphthalenesulfonic acid condensate | 0.15 |

An atmosphere of nitrogen is maintained throughout the polymerization and the subsequent amine treatment. Polymerization is carried out to complete conversion at 40° C. using a 5% aqueous solution of potassium persulfate as catalyst. The latex has a pH of 12.5 To a portion of this latex is added 1.5 part (0.021 mole) of butylamine and 1 part of morpholine (0.012 mole) per 100 grams of polymer and the latex is maintained at 60° C. for 24 hours. Dipped films are prepared from the latex before and after the latex has aged at 8 days at 50° C. The following table shows the highly satisfactory properties of the dipped films prepared as described in Example 1.

TABLE VI

| | Sample | |
|---|---|---|
| | Unaged | Aged |
| Tensile strength at the break, p.s.i | 3,290 | 2,500 |
| Modulus at 600% elongation, p.s.i | 910 | 869 |
| Elongation at the break, percent | 890 | 900 |

Example 10

A polychloroprene latex is prepared using the following recipe:

| | Parts by weight |
|---|---|
| Chloroprene | 100 |
| Disproportionated resin | 3 |
| Polymerized linoleic acid (same as in Example 3) | 2 |
| Sodium hydroxide | 0.925 |
| Diisopropyl xanthogen disulfide | 0.75 |
| Water | 95 |
| Sodium sulfite | 0.3 |

An atmosphere of nitrogen is maintained in the vessel during polymerization and subsequent amine treatment. Polymerization is carried out to complete conversion at 30° C. using a 2 percent solution of potassium persulfate as catalyst. The latex has a pH of 11.8 To the resulting latex is added, per 100 grams of polymer, 5 parts of ethylenediamine (0.083 mole) and 2 parts of 2,6-dimethylmorpholine (0.017 mole) and the latex is heated at 90° C. for 0.5 hour. A portion of the treated latex is aged at 50° C. for 5 days. Dipped films are prepared from the unaged and aged samples as described in Example 1. The highly satisfactory properties of this dipped film are shown below:

TABLE VII

| | Sample | |
|---|---|---|
| | Unaged | Aged |
| Tensile strength at the break, p.s.i | 2,630 | 3,200 |
| Modulus at 600% elongation, p.s.i | 600 | 930 |
| Elongation at the break, percent | 1,030 | 907 |

Example 11

A polychloroprene latex is prepared using the following recipe:

| | Parts by weight |
|---|---|
| Chloroprene | 100 |
| Disproportionated rosin | 3 |
| Polymerized linoleic acid (same as in Example 3) | 2 |
| Sodium hydroxide | 0.925 |
| Diisopropyl xanthogen disulfide | 0.75 |
| Dicyclohexylamine | [1] 1.5 |
| Water | 95 |
| Sodium sulfite | 0.3 |

[1] 0.008 mole.

Polymerization is carried to 100% conversion at 30° C. using a 2% aqeuous solution of potassium persulfate as catalyst. A nitrogen atmosphere is maintained in the reaction vessel. The pH of the resulting latex is about 12.8. To a portion of the latex so obtained is added 2 parts of 1,6-hexanediamine (0.017 mole) and a temperature of 90° C. is maintained for 0.5 hour. Dipped films are prepared from the treated latex as described in Example 1. A sample of the treated latex is aged at 50° C. for 7 days and is then used for preparing dipped films. It is to be noted that in this example the secondary monoamine is added directly to the recipe, whereas the primary polyamine is added later. The highly satisfactory properties of the dipped films prepared from the unaged and aged latex are shown below:

TABLE VIII

| | Sample | |
|---|---|---|
| | Unaged | Aged |
| Tensile strength at the break, p.s.i | 2,770 | 2,510 |
| Modulus at 600% elongation, p.s.i | 850 | 1,000 |
| Elongation at the break, percent | 895 | 830 |

The term "chloroprene polymer" as used in the hereindescribed process refers to copolymers of more than 40 weight percent chloroprene monomer with another copolymerizable monomer, e.g., 2,3-dichloro-1,3-butadiene, acrylonitrile and methacrylic acid, as well as homopolymers of chloroprene. When such copolymers are substituted for the homopolymers in the above examples similar results are obtainable.

The latex prepared in accordance with this invention is particularly suitable for the preparation of dipped films which cure rapidly and have excellent tensile properties, e.g., for the preparation of rubber gloves, rubber threads or the like. The dipped films may be prepared by conventional methods, as, for example, as described in Cook and Fitch, "Neoprene Dipped Goods," Rubber Chemicals Division (now Elastomer Chemicals Department), E. I. du Pont de Nemours and Co., Report No. 52-3, December 1952. The films produced from the latex prepared in accordance with this invention require shorter times and lower temperatures to develop optimum tensile properties than do films prepared from conventional neoprene latices. Furthermore, the treated latex may be stored without coagulation of the polymer for a considerable length of time, and films prepared from the stored latex will show little or no deterioration in tensile properties compared with films prepared from freshly treated latex.

The treated latex prepared in accordance with this invention may also be used for the preparation of foam and for other applications in which a prevulcanized latex is desired.

What is claimed is:

1. A process which comprises polymerizing chloroprene in aqueous emulsion in the presence of (a) from about 0.05 to 2 parts by weight, per 100 parts of monomer, of a dialkyl xanthogen disulfide in which each alkyl group contains from about 1 to 8 carbon atoms, and (b) from about 3 to 5 parts by weight, per 100 parts of monomer, of an emulsifying composition comprising from about 15 to 50 weight percent of a fatty acid soap and from about 50 to 85 weight percent of a rosin acid soap, said polymerization being carried out to the maximum monomer conversion at which only sol polymer is obtained.

2. A process for preparing a prevulcanized chloroprene polymer latex which comprises: (I) polymerizing chloroprene in aqueous emulsion in the presence of (a) from about 0.05 to 2 parts by weight, per 100 parts of monomer of a dialkyl xanthogen disulfide in which each alkyl group contains from about 1 to 8 carbon atoms, and (b) from about 3 to 5 parts by weight, per 100 parts of monomer, of an emulsifying composition comprising from about 15 to 50 weight percent of a fatty acid soap and from about 50 to 85 weight percent of a rosin acid soap, said polymerization being carried out to the maximum monomer conversion at which only sol polymer is obtained; (II) treating the resulting latex at a pH greater than about 10 and in an inert atmosphere free of atmospheric oxygen by adding thereto at least about 0.005 mole, per 100 parts by weight of polymer in the latex, of a mixture comprising (a) a member of the group consisting of hydrazine, a primary monoamine and a primary polyamine, in which last two compounds the amino group is attached to an aliphatic carbon atom, and (b) a secondary monoamine selected from the group consisting of secondary monoamines in which the amino group is attached only to aliphatic carbon atoms, and secondary monoamines in which the amino group is part of a saturated heterocyclic ring, the molar ratio of (a) to (b) being in the range of about 0.5 to 5 of (a) to 1 of (b); and, (III) subjecting the resulting treated latex to a temperature of from about 10° C. to 100° C. for a period of time sufficient to convert the sol polymer contained in the latex to gel polymer.

3. A process for preparing a prevulcanized chloroprene polymer latex which comprises: (I) polymerizing chloroprene in aqueous emulsion in the presence of (a) from about 0.7 to 1 part by weight, per 100 parts of monomer, of diisopropyl xanthogen disulfide, and (b) from about 3 to 5 parts by weight, per 100 parts of monomer, of an emulsifying composition comprising from about 15 to 50 weight percent of a fatty acid soap and from about 50 to 85 weight percent of a rosin acid soap, said polymerization being carried out to the maximum monomer conversion at which only sol polymer is obtained; (II) treating the resulting latex at a pH greater than about 10 and in an inert atmosphere free of atmospheric oxygen by adding thereto from about 0.01 to 0.2 mole, per 100 parts by weight of polymer in the latex, of a mixture comprising (a) a primary alkanediamine of from about 2 to 8 carbon atoms, and (b) a secondary monoamine in which the amino group is part of a saturated 6-membered heterocyclic ring, the molar ratio of (a) to (b) being in the range of about 1 to 2 of (a) to 1 of (b); and, (III) subjecting the resulting treated latex to a temperature of from about 60° C. to 100° C. for a period of time sufficient to convert the sol polymer contained in the latex to gel polymer.

4. A process as defined in claim 3 wherein said primary alkanediamine is 1,6-hexanediamine.

5. A process as defined in claim 3 wherein said secondary monoamine is piperidine.

6. A process as defined in claim 3 wherein said secondary monoamine is morpholine.

7. A process as defined in claim 3 wherein said secondary monoamine is 2,6-dimethylmorpholine.

8. A prevulcanized chloroprene polymer latex prepared by the process of claim 2.

9. A prevulcanized chloroprene polymer latex prepared by the process of claim 3.

10. A process for preparing a dipped film, which process comprises: (I) polymerizing chloroprene in aqueous emulsion in the presence of (a) from about 0.05 to 2 parts by weight, per 100 parts of monomer, of a dialkyl xanthogen disulfide in which each alkyl group contains from about 1 to 8 carbon atoms, and (b) from about 3 to 5 parts by weight, per 100 parts of monomer, of an emulsifying composition comprising from about 15 to 50 weight percent of a fatty acid soap and from about 50 to 85 weight percent of a rosin acid soap, said polymerization being carried out to the maximum monomer conversion at which only sol polymer is obtained; (II) treating the resulting latex at a pH greater than about 10 and in an inert atmosphere free of atmospheric oxygen by adding thereto at least about 0.005 mole per 100 parts by weight of polymer in the latex of a mixture comprising (a) a member of the group consisting of hydrazine, a primary monoamine and a primary polyamine, in which last two compounds the amino group is attached to an aliphatic carbon atom, and (b) a secondary monoamine selected from the group consisting of secondary monoamines in which the amino group is attached only to aliphatic carbon atoms, and secondary monoamines in which the amino group is part of a saturated heterocyclic ring, the molar ratio of (a) to (b) being in the range of about 0.5 to 5 of (a) to 1 of (b); (III) subjecting the resulting treated latex to a temperature from about 10° C. to 100° C. for a period of time sufficient to convert the sol polymer contained in the latex to gel polymer; and (IV) forming a coagulated film of the resulting treated latex.

11. A process for preparing a dipped film, which process comprises: (I) polymerizing chloroprene in aqueous emulsion in the presence of (a) from about 0.7 to 1 part by weight, per 100 parts of monomer, of diisopropyl xanthogen disulfide, and (b) from about 3 to 5 parts by weight, per 100 parts of monomer, of an emulsifying composition comprising from about 15 to 50 weight percent of a fatty acid soap and from about 50 to 85 weight percent of a rosin acid soap, said polymerization being carried out to the maximum monomer conversion at which only sol polymer is obtained; (II) treating the resulting latex at a pH greater than about 10 and in an inert atmosphere free of atmospheric oxygen by adding thereto from about 0.01 to 0.2 mole per 100 parts by weight of polymer in the latex of a mixture comprising (a) a primary alkanediamine of from about 4 to 8 carbon atoms, and (b) a secondary monoamine in which the amino group is part of a saturated 6-membered heterocyclic ring, the molar ratio of (a) to (b) being in the range of about 1 to 2 of (a) to 1 of (b); (III) subjecting the resulting treated latex to a temperature from about 60° C. to 100° C. for a period of time sufficient to convert the sol polymer contained in the latex to gel polymer; and (IV) forming a coagulated film of the resulting treated latex.

12. A process as defined in claim 11 wherein said primary alkanediamine is 1,6-hexanediamine.

13. A process as defined in claim 11 wherein said secondary monoamine piperidine.

14. A process as defined in claim 11 wherein said secondary monoamine is morpholine.

15. A process as defined in claim 11 wherein said secondary monoamine is 2,6-dimethylmorpholine.

16. A dipped film prepared by the process of claim 10.

17. A dipped film prepared by the process of claim 11.

References Cited by the Examiner
UNITED STATES PATENTS

| | | | |
|---|---|---|---|
| 2,359,698 | 10/1944 | Uhlig | 260—92.3 |
| 3,047,544 | 7/1962 | Byrd | 260—79 |
| 3,190,865 | 6/1965 | Miller | 260—92.3 |

OTHER REFERENCES

Audrieth et al.: Journal of Organic Chemistry, vol. 19 (1954), pages 733–748.

JOSEPH L. SCHOFER, *Primary Examiner.*

H. I. CANTOR, *Assistant Examiner.*

UNITED STATES PATENT OFFICE
CERTIFICATE OF CORRECTION

Patent No. 3,317,451　　　　　　　　　　　　　　　　May 2, 1967

David Apotheker

It is hereby certified that error appears in the above numbered patent requiring correction and that the said Letters Patent should read as corrected below.

Column 8, in TABLE IV, second column, line 1 thereof, for "2,590" read -- 2,500 --; column 9, TABLE V, second column, line 1 thereof, for "3,190" read -- 3,100 --; column 13, line 15, after "monoamine" insert -- is --.

Signed and sealed this 14th day of November 1967.

(SEAL)

Attest:

Edward M. Fletcher, Jr.

Attesting Officer

EDWARD J. BRENNER

Commissioner of Patents